United States Patent [19]

Dumas et al.

[11] Patent Number: 4,544,641

[45] Date of Patent: Oct. 1, 1985

[54] REFRACTORY PRODUCTS FORMED BY GRAINS BOUND BY CARBON RESIDUES AND METAL SILICON IN POWDER FORM AND PROCESS FOR THE PRODUCTION THEREOF

[75] Inventors: Daniel Dumas, Saint Priest; Bruno du Mesnildot, Lyons; Christian Michel, Sainte-foy-les-Lyon, all of France

[73] Assignee: Societe des Electrodes et Refractaires Savoie (SERS), Courbevoie, France

[21] Appl. No.: 629,547

[22] PCT Filed: Dec. 6, 1983

[86] PCT No.: PCT/FR83/00243

§ 371 Date: Jul. 10, 1984

§ 102(e) Date: Jul. 10, 1984

[87] PCT Pub. No.: WO84/02335

PCT Pub. Date: Jun. 21, 1984

[30] Foreign Application Priority Data

Dec. 8, 1982 [FR] France ................. 82 20893

[51] Int. Cl.$^4$ ................. C04B 35/52; C04B 35/56
[52] U.S. Cl. ................. 501/87; 501/88; 501/89; 501/90; 501/99; 501/100
[58] Field of Search ................. 501/88, 89, 90, 99, 501/100

[56] References Cited

U.S. PATENT DOCUMENTS

| | | | |
|---|---|---|---|
| 2,013,625 | 11/1935 | Buck | 501/90 |
| 3,291,623 | 12/1966 | Saunders et al. | 501/92 |
| 3,442,989 | 5/1969 | Hildekrandt | 264/29.3 |
| 4,294,788 | 10/1981 | Laskow et al. | 501/90 |
| 4,393,143 | 7/1983 | Yoshinaka et al. | 501/99 |

FOREIGN PATENT DOCUMENTS

| | | |
|---|---|---|
| 2232719 | 6/1972 | Fed. Rep. of Germany . |
| 2286806 | 4/1976 | France . |
| 8077980 | 12/1978 | Japan . |

OTHER PUBLICATIONS

Elettrocarbonium Works publication at AIME Congress, Feb. 1982, Letizia et al.

Billehaug et al., Aluminium (FRG), vol. 56, Oct. 1980, pp. 642–648 and 713–718.

*Primary Examiner*—William R. Dixon, Jr.
*Assistant Examiner*—Karl Group
*Attorney, Agent, or Firm*—Dennison, Meserole, Pollack & Scheiner

[57] ABSTRACT

The invention concerns a fired refractory product based on refractory grains and binder, and process for the production thereof.

The refractory product comprises a charge of refractory grains belonging to the group comprising carbonaceous products such as anthracite, natural graphite, artificial graphite, amorphous carbon, coke, refractory compounds known as RHM such as silicon carbide and refractory oxides such as alumina, corundum, magnesia, silica and chromium oxide, taken separately, in mixture or in combination; said grains are secured together by a cement based on a coked carbonaceous product and metal silicon in powder form; and the final proportion of metal silicon is from 1 to 15.8% and preferably from 3 to 10.5%.

The product is intended for the manufacture of side linings for tanks for the production of aluminum by igneous electrolysis, and linings for blast furnaces and electric furnaces for electrometallurgy operations.

20 Claims, No Drawings

REFRACTORY PRODUCTS FORMED BY GRAINS BOUND BY CARBON RESIDUES AND METAL SILICON IN POWDER FORM AND PROCESS FOR THE PRODUCTION THEREOF

The present invention concerns refractory products which can be used either in aluminium electrolysis cells, in particular in the form of blocks or slabs forming the edge of such cells, or in the linings of blast furnace or electrothermy furnaces.

In the case of aluminium electrolysis cells, the introduction of high current strengths gave rise to accelerated wear of the edges of the cells when made with the existing products. The need has arisen, for refractory products which are even more resistant under those new operating conditions, while however remaining acceptable from the economic point of view.

The qualities required in respect of such refractory products, in the above-mentioned particular case of the edges of aluminium electrolysis cells, correspond to criteria such as:

a high level of electrical resistivity in order to restrict current leakage through the edges of the cells;

a high degree of thermal conductivity in order to promote the formation and maintenance of a crust of soldified aluminium along the edges of the cell, thereby to limit contact with the aluminium in the molten condition and the molten cryolite;

good resistance to crushing, which is an important criterion with regard to the resistance to erosion of the edges of cells;

good resistance to oxidation; and good resistance with respect to the fluorine-bearing bath (to the molten cryolite).

If the last two criteria can be the subject of laboratory tests which give initial information which is comparative in nature, only tests under practical operating conditions can make it possible to arrive at a more precise opinion, concerning the performance of the material in actual service, which involves oxidation-erosion mechanisms with thermal stresses and occasional attack by the molten cryolite.

In the case of blast furnace linings, the qualities required are as follows:

good resistance to erosion by the liquid pig iron, good resistance to oxidation, a high level of mechanical strength, and a high degree of thermal conductivity in order for the lining to have an efficient action.

The requirements are similar in regard to electrometallurgical furnaces (production of steels and ferrous alloys in particular).

For the purposes of producing refractory products which are intended for those two types of use, agglomeration and firing or burning processes are most frequently used, with the starting material being in particular grains of silicon carbide in the case of the edging blocks for aluminium electrolysis furnaces, and in particular grains of alumina or aluminates in the case of blocks for forming the lining for blast furnaces and electrothermy furnaces.

Processes for the production of refractory blocks in which the essential component is silicon carbide seek to produce either silicon carbide throughout the material or silicon carbide in association with silicon nitride or oxynitride, and those processes use as their starting material, a mixture which essentially comprises silicon carbide in grain form, silicon in powder form and carbonaceous substances, the amount of silicon and the amount of carbonaceous material which is liberated by the coking operation being in a ratio which is intended to promote the formation of silicon carbide, which may or may not be associated with silicon nitride and oxynitride.

Thus, in the process described in German laid-open application (DE-OS) No. 22 32 719 which relates to refractory blocks used in blast furnaces, the composition is normally adjusted in such a way that the amount of silicon powder which is added to the starting material and the amount of coke formed from pitch or tar, which is possibly supplemented by a make-up amount of fine coke powder, stoichiometrically correspond to each other, and the improvement in strength of the refractory blocks which are fired in furnaces for firing carbonaceous materials at final temperatures which reach 1100° to 1300° C. is due to the fact that the framework or skeleton of the fired binder is composed of silicon carbide which is produced at the higher temperatures of the firing procedure, by the reaction of silicon with the coke formed by coking.

French patent application FR-A-No. 2286 806 states that the process described in German application DE-OS No. 22 32 719 can be improved, with the binding material produced being of a structure which has insufficient adhesion to the joining surfaces of the grains of SiC and which still contains metal silicon and/or carbon. The process described in French application FR-A No. 2286 806 promotes the formation of SiC in substantially pure form, that is to say, not mixed with metal silicon, free carbon or $SiO_2$, by diluting the pitch with a fluid tar oil so as to enhance the contact between the binder and the grains of SiC, and firing is effected at temperatures of between 1305° and 1400° C., for example 48 hours, at a brick temperature of 1320° C. It is stated that it is preferable for the ratio by weight of the binder to the silicon, which is dependent on the reactive carbon freed by coking, to be between 0.8 and 3.0 and preferably between 1.0 and 1.5.

In the process described by Japanese patent application JA No. 55 80779/80, the grains of silicon are protected from oxidation when subjected to heating by virtue of the surface thereof being properly covered by a binding agent of suitable quality, and the ratio by weight between the metal silicon in powder form and the residual carbon from the pitch must be between 3/1 and 6/1. After the coking step, at a temperature above 450° C., which ensures intimate contact between the residual C from the pitch and the surface of the grains of metal silicon, the heating operation is continued at high temperature in air or in a gaseous mixture containing nitrogen, and results in the formation of SiC from residual carbon and Si—beginning at temperatures of higher than 1100° C.—and the formation of $Si_3N_4$ and $Si_2ON_2$—which begins as from 1000° to 1100° C. In the case of a block measuring 120×200×400 mm, which was treated for 30 hours at 1400° C., after a rise in temperature of 20° C. per hour, being subjected to a blast of gas containing nitrogen above 1000° C., the process, by virtue of the mixed bond (SiC, $Si_3N_4$, $Si_2ON_2$), produces resistance to crushing of 2070 kg/cm2 (203 MPa), as well as very high levels of resistance to abrasion, flaking after immersion in the molten material at 1500° C., and corrosion by a cryolite bath at a temperature of 1000° C.

Thus, the processes which aim to produce, after firing, refractory products which essentially comprise silicon carbide—optionally associated with silicon nitride or oxynitride—from a mixture containing silicon in powder form, have recourse to various precautions in order to prevent or limit oxidation, improve contact between the grains of silicon and the carbonaceous binder and to provide the best adjustment in respect of the respective amounts of silicon and carbon resulting from the coking operation, all that in order to promote the formation of silicon carbide, and such processes preferably use firing temperatures of more than 1300° C., with treatment times which can exceed 24 hours. In comparison, the processes for producing refractory products which are composed of grains of silicon carbide which are agglomerated by a 'carbonaceous bond' usually involve firing conditions which are more economical and in particular lower firing temperatures of from 900° to 1150° C., and they usually give products which have lower levels of performance, for example in the case of the edge blocks for high-current aluminium electrolysis cells.

The process described in U.S. Pat. No. 3,442,989 produces products which are essentially silicon carbide-based with a 'carbonaceous bond', starting from a mixture of SiC particles, from 4 to 12% of carbonaceous binder, in particular pitch, and from 0.5 to 10% of sulphur, with the operation of firing the products preferably being performed at from 900° to 1200° C. The addition of sulphur would play a double part: the sulphur would render the pitch more fluid and in addition it would combine with the hydrogen in the pitch in the form of $H_2S$ which would promote the formation of a resin having a high carbon content from the carbon contained in the pitch. Taking the mixture given by way of example, containing 6% of pitch and 2% of sulphur, the following characteristics were achieved, after firing: density: 2.70 g/cm3; electrical resistivity of 200 milliohms×cm; resistance to crushing of the order of 450 kg/cm2 (55.1 MPa).

The process described by ELETTROCARBONIUM in its publication at the A.I.M.E. Congress in Dallas in February 1982 takes as its starting material silicon carbide and a binder formed by a mixture of pitches with about 5% of an 'inorganic compound' for reducing oxidation of the binder after coking. The refractory blocks produced after firing have characteristics in respect of electrical resistivity (84 to 95 milliohms×cm), resistance to crushing (640 to 700 kg/cm2=62.7 to 68.6 MPa) and resistance to oxidation at 550° C., that are substantially better than the characteristics of conventional carbon-bearing blocks.

Those two publications show that the quality of the refractory products formed of grains of SiC agglomerated by a carbonaceous binder could be substantially improved by modifying the quality of the binder in order to make it more fluid and to combat oxidation.

The present invention concerns a novel refractory product having a high level of resistance to crushing and high tensile strength, with improved thermal conductivity and enhanced electrical resistivity (100 to 300 mΩ cm), of low porosity, which has good resistance to oxidation in air and to the constituents of the igneous electrolysis baths used for the production of aluminium, as well to erosion due to the liquid melt in blast furnaces. That product is formed by the association of a charge of refractory grains and a binder. The refractory grains belong to the group comprising carbonaceous products such as anthracite, natural graphite, artificial graphite, amorphous carbon and coke, the refractory compounds which are usually referred to by the abbreviation 'R.H.M.' (refractory hard metals), designating carbides and borides of metals referred to as transition metals, to which silicon is added (see for example BILLEHAUG, K, and OYE, H. A., Aluminium (FRG), 56, October 1980, pages 643 ff), and, among said R.H.M., more particularly, silicon carbide, and finally refractory oxides such as alumina and corundum, magnesia, silica and chromium oxide, taken separately, in mixture or in combination, said grains being held together by a cement based on carbonaceous residue, and metal silicon, the carbonaceous residue resulting from coking of the base binder such as pitch or tar, thermosetting resin (for example formolphenolic resin) or other organic binder which can be pyrolysed with the formation of coke, and the metal silicon being in the form of powder, in a proportion of from 1 to 15.8% and preferably from 3.2 to 10.5%.

The charge of refractory grains may be formed either in its entirety by carbonaceous grains or by a mixture of from 10 to 20% of grains of RHM and from 90 to 80% of carbonaceous material, or by a mixture of from 45 to 100% of grains of RHM and from 55 to 0% of carbonaceous grains. In both cases, at least a part of the grains of RHM and/or the carbonaceous grains may be replaced by grains of refractory oxides, as defined hereinbefore.

In fact, it was found that, under the usual conditions in respect of firing carbon electrodes, refractory products produced from refractory grains such as grains of silicon carbide and a carbonaceous binding agent such as pitch had very poor resistance to crushing and that, when metal silicon in powder form was added to the initial mixture, the resistance to crushing of the refractory products produced in accordance with the same mode of procedure was surprisingly improved, going for example from 6.6 to 107.8 MPa (example 1). Observation under a microscope of a sample of binding agent fired at 1050° C. led to the conclusion that the surprising improvement referred to above was linked to good adhesion of the grains of metal silicon to the carbonaceous residues, and that the grains of silicon had remained in the metal state, and further X-ray diffractometry examination did not reveal silicon carbide in that product. It is therefore that particular structure of the fired binding agent, forming a cement, that is to say, the matrix which encases the refractory grains in the fired refractory powder, which is essentially responsible for the spectacular improvement in resistance to crushing which is produced by the addition of metal silicon in powder form to the starting mixture. In addition, silicon is not used in the present invention for forming silicon carbide, as in the processes described by above-mentioned DE-OS No. 22 32 719 and French FR-A No. 2286 806, or for forming silicon carbide associated with silicon nitride and oxynitride, as in the process described in Japanese patent application JA No. 55 80779/80, but the silicon remains present in the state of metal and appears to act as a reinforcing agent for the binding agent in the same way as ballast reinforces concrete. It will be appreciated therefore that the present invention can be applied to the various qualities of refractory grains and in particular to carbonaceous grains, grains of RHM such as silicon carbide, and refractory oxide grains, as defined hereinbefore.

It will also be appreciated that the function of reinforcing the fired binding agent performed by the metal silicon in powder form does not require a stoichiometric correspondence between the amount of silicon and the amount of residual carbon, which is an appreciable simplification in regard to the manufacturing conditions.

The present invention also concerns the process for the production of a refractory product based on refractory grains and binding agent, wherein a starting mixture of the following composition is prepared by mixing:

charge of refractory grains: 70 to 95% by weight
pitch and/or tar and/or resin: 4 to 20% by weight
metal silicon in powder form: 1 to 15% by weight
the refractory grains belonging to the group comprising the RHM such as silicon carbide, carbonaceous products such as anthracite, natural or artificial graphite, amorphous carbon, coke, refractory oxides such as alumina, corundum, magnesia, silica and chromium oxide, taken separately, in mixture or in combination, the pitch or tar or resin and the metal silicon being intended to form the binder, that the mixture is shaped and that the firing operation is effected at from 950° to 1150° C.

The production process is that used in the production of carbon electrodes. It typically comprises the following operations: mixing the products at about 150° C., shaping the products at about 110° C. by a process such as press extrusion, isostatic compression, ramming or vibro-compacting, and firing in a furnace under a blanket of carbon granules. The firing operation is preferably effected at from 1000° to 1090° C. The final silicon content is from 1 to 15.8%.

Preferably, the starting mixture comprises:
a charge of refractory grains as defined hereinbefore, in total: 75 to 90% by weight
pitch and/or tar and/or resin: 6 to 14%
metal silicon in powder form: 3 to 10%
and the resulting product then has a silicon content of from 3.2 to 10.5%.

Finally, the invention concerns mixed refractory blocks of which a part, for example on a face thereof, is formed by a first refractory product according to the invention and another part, for example the opposite face, is formed by a second refractory product of different composition which is known or which is included within the scope of the present invention, based on carbonaceous product or refractory oxide compound, which provides for producing linings in which each face is adapted to the particular conditions in respect of temperature, resistance to corrosion or oxidation or any other physical or chemical factor. On the same principle, it is possible to manufacture mixed blocks formed by the superposition of three or more layers of refractory products, the intermediate layer or layers having a physical property, for example a coefficient of expansion, which is intermediate in value between the same property of the two outer layers, so as to avoid for example fractures due to thermal stresses, one at least of the layers of refractory product being of a composition in accordance with the present invention.

EXAMPLE 1

The comparative tests of Table I hereinafter relate to four samples of $\phi$ 60×h 100 mm, mixed at 150° C., compressed under 50 MPa and fired for 5 hours at 1050° C. under a cover of carbon granules.

TABLE I

| Sample identification | | A | B | C | D |
|---|---|---|---|---|---|
| Type of refractory product obtained | | anthracite bound with pitch coke | SiC bound with pitch coke | SiC bound with pitch coke + Si | amorphous SiC + crystallised SiC pitch coke + Si |
| Composition of initial mixture (% by weight) | | | | | |
| | mesh (mm) | | | | |
| Crystallised SiC | 14/24 (0.59 to 1.16) | as industrial production | 40.5 | 40.5 | 16 |
| Crystallised SiC | <100 (<0.15) | | 40.5 | 40.5 | 16 |
| Crystallised SiC | <400 (<0.037) | | 7 | 0 | 0 |
| Amorphous SiC | <12 (<1.65) | | 0 | 0 | 49 |
| Si | <300 (<0.05) | | 0 | 7 | 7 |
| Coal pitch | | | 12 | 12 | 12 |
| d (g/cm$^3$) | | 1.56 | 2.25 | 2.22 | 2.20 |
| $R_E$ (MPa) | | 29.4 | 6.6 | 107.8 | 43.1 |
| $R_T$ (MPa) | | 2.9 | 0.6 | 9.8 | 3.5 |
| $\rho$ (milliohm × cm) | | 5 | 380 | 158 | 139 |

Comparison of the results of samples B and C shows the remarkable effect of adding silicon on the resistance to crushing $R_E$ and on tensile strength $R_T$ of the refractory product C according to the invention based on silicon carbide grains. Sample C outclasses sample A which represents the industrial production of carbon electrodes, both in respect of resistance to crushing and in respect of tensile strength as well as electrical resistivity $\rho$.

In sample D according to the invention, the major part of the crystallised SiC has been replaced by amorphous SiC of lower purity; resistance to crushing and tensile strength produced are then lower than in the case of sample C but better than in the case of A, which illustrates the possible attraction of using mixtures of refractory grains of various qualities, in the interests of economy.

EXAMPLE 2

A sample $\phi$ 60×h 100 mm is prepared, being binding agent fired for 5 hours at 1050° C. as described above, starting from a mixture comprising 30% of coal tar and 70% of metal silicon in powder from (grains<300 mesh, that is to say, <0.05 mm).

The resistance to crushing of the fired binder produced in that way was found to be equal to 60.3 MPa.

Micrographic examination (G=1400) showed that the carbonaceous residues intimately adhered to the grains of silicon in the fired binder, and that the grains of silicon were present therein in the metal state.

That good adhesion between the silicon grains in the metal state and the carbonaceous residues in the binding agent which was prepared in that way may be transposed to the situation of products based on refractory grains such as grains of silicon carbide, for example in regard to sample C where the addition of silicon has a remarkable effect on resistance to crushing and tensile strength. It is thus the improvement in the quality of the matrix encasing the refractory grains, the matrix also being referred to in this specification as 'cement' or 'fired binder', which essentially explains the improvement in the characteristics of the refractory product.

EXAMPLE 3

The comparative tests set out in Table II refer to samples measuring $\phi$ 60×h 100 mm based on grains of calcined alumina, which are mixed or worked and compressed as in Example 1 and fired for 8 hours at 1030° C. under a blanket of carbon granules.

TABLE II

| Identification | | | E | F | G |
|---|---|---|---|---|---|
| Type of refractory product obtained | | | alumina bound with pitch coke | alumina bound with pitch coke + Si | alumina + carbon which are bound with pitch coke + Si |
| Composition of the initial mixture (% by weight) | | | | | |
| | mesh | mm | | | |
| alumina | 100 | (<0.15) | 85 | 74.6 | 49 |
| carbon | — | (<0.2) | 0 | 0 | 22.5 |
| Si | 300 | (<0.05) | 0 | 12.7 | 14.25 |
| Coal pitch | | | 15 | 12.7 | 14.25 |
| d (g/cm$^3$) | | | 2.45 | 2.44 | 2.05 |
| $R_E$ (MPa) | | | 12.7 | 100.5 | 63.7 |

Comparison of the results obtained with samples F and E shows the remarkable effect of adding silicon on the resistance to crushing of the refractory product based on grains of alumina. In sample G, a substantial part of the alumina was replaced by anthracite carbon (grains<0.2 mm with 45% smaller than 74μ), and nonetheless the resistance to crushing attained was 63.7 MPa.

EXAMPLE 4

A series of edge slabs measuring 550×350×100 mm and weighing 47 kg, intended for electrolysis tanks for the production of aluminium, were prepared in the following manner (sample H):

| | | |
|---|---|---|
| initial mixture | SiC 14/24 (0.59 to 1.16 mm) | 42.8% by wt |
| | SiC <100 (<0.15 mm) | 42.8% |
| | Si <300 (<0.05 mm) | 4.4% |
| | coal pitch | 10% |
| mixing for 45 minutes at 150° C. | | |
| shaping by ramming at 150° C. | | |
| firing by being maintained at 1050° C. for 5 hours, under a cover of carbon granules, in a conventional carbon electrode firing furnace. | | |

The results of examination of the refractory product obtained are as follows:

(a) d=2.4 g/cm$^3$—$R_E$=74.5 MPa—$R_T$=9.0 MPa—$\rho$=182 milliohm×cm, conductivity at 80° C.=31 W.m$^{-1}$ K$^{-1}$-coefficient of expansion 3.80×10$^{-6}$.K$^{-1}$, (b) wear due to oxidation was tested on a testpiece measuring $\phi$ 22×h 50 mm by the following method: heating up to 550° C. with nitrogen scavenging, then at 550° C., with air blast at constant flow rate for 1 hour, followed by cooling in nitrogen, and weighing.

The testpiece H in that test experienced a reduction in weight of 0.5% whereas the reference testpiece comprising carbon (such as the sample A in Example 1) suffered a drop in weight of 20%, and (c) finally, resistance to a fluorine-containing bath was tested on another testpiece taken from sample H: this is a test involving electrolysis in a bath of molten cryolite and alumina for 5 hours. The testpiece had not suffered from any wear which was visible to the eye after that test, and that was judged to be an excellent result.

All the results concerning sample H combined with the results already referred to above in respect of sample C show that this novel type of refractory material based on grains of silicon carbide, in which the binder contains carbonaceous residues and silicon in powder form in the state of metal, is particularly attractive for forming the edges of aluminium electrolysis cells.

The coefficient of expansion as measured on sample H is close to that of carbonaceous blocks, so that it is possible to produce mixed refractory blocks and use same in aluminium electrolysis tanks, for example blocks in which a part of the volume of the side which is inward of the tank is formed by the product comprising silicon carbide and containing silicon in powder form in accordance with the invention, while the other part of the volume disposed on the side which is outward of the tank is formed by a conventional carbonaceous product, the connection between the two parts being made by one of the connecting methods which are known to the man skilled in the art, for example by simultaneous compression of layers of the two initial mixtures (see Examples 11 and 12).

EXAMPLE 5

A sample I measuring $\phi$ 235×h 205 mm and of the same composition as sample H was mixed and shaped in the same manner and was then fired by being held at a temperature of 1150° C. for 5 hours under a cover of carbon granules in the same carbon electrode firing furnace.

The sample I was found to have the following characteristics: d=2.39 g/cm3 and $R_E$=70.6 MPa.

The resistance to crushing $R_E$ of sample I which is fired at 1150° C. and that of sample H which is fired at 1050° C. are close, which shows that the operation of firing the refractory product according to the invention may be performed at a product temperature of 1150° C., being the usual maximum temperature for firing carbon electrodes, while maintaining a high value in respect of resistance to crushing.

EXAMPLE 6

Table III hereinafter is concerned with comparative tests relating to samples measuring $\phi$ 60×h 100 mm which are mixed and pressed as in Example 1 and fired under different conditions:

TABLE III

| Refractories comprising SiC bound with pitch coke + Si | | | | | |
|---|---|---|---|---|---|
| Identification | | | J | K | L |
| Firing treatment | | | 950° C.-5h | 1050° C.-5h | 570° C.-5h + 1050° C.-5h |
| Composition of initial mixture (% by weight) | mesh | mm | | | |
| SiC 14/24 | 14/24 | (0.59–1.16) | 40.5 | 40.5 | 42.8 |
| SiC | <100 | (<0.15) | 40.5 | 40.5 | 42.8 |
| Si | <300 | (<0.05) | 7 | 7 | 4.5 |
| coal pitch | | | 0 | 0 | 10 |
| coal tar | | | 12 | 12 | 0 |
| d (g/cm$^3$) | | | 2.22 | 2.27 | 2.28 |
| $R_E$ (MPa) | | | 21.1 | 40.3 | 50.0 |
| $R_T$ (MPa) | | | 1.4 | 6.9 | not measured |
| $\rho$ (milliohm × cm) | | | not measured | not measured | 250 |

As regards the resistance to crushing $R_E$, the samples J-K-L are all markedly better than sample D of Example 1 which was prepared without the addition of silicon powder. Sample J which is fired at 950° C. is less good than sample K which is fired at 1050° C. and sample L which is coked at 570° C. and then fired at 1050° C. is a little better than K.

This Example shows firstly that, in the range of usual temperatures for firing carbon electrodes, from 900° to 1150° C., the low temperatures are already an attractive proposition in regard to firing the refractory product according to the invention, and that, taking account of the result of Example 5, the full range of from 900° to 1150° C. is to be employed. This Example also shows, in association with the preceding Examples, that a restricted range centered on 1050° C. such as 1000° C. to 1090° C. is preferable in regard to quality of the refractory product of the invention.

EXAMPLE 7

Table IV concerns a comparative test relating to samples measuring $\phi$ 60×h 100 mm, which are mixed and compressed as in Example 1 and fired for 5 hours at 1050° C., the initial mixtures of which comprise both silicon carbide and anthracite, the latter being in the form of grains <0.2 mm with 45% of fines smaller than 74 μm.

TABLE IV

| Refractory materials comprising SiC + anthracite | | | | |
|---|---|---|---|---|
| Identification | | | M | N |
| Composition of the initial mixture (% by wt) | mesh | (mm) | | |
| SiC | 14/24 | (0.59 to 1.16) | 40.4 | 40.4 |
| anthracite | — | (0.2) | 40.3 | 40.3 |
| Si | <300 | (<0.05) | 4.3 | 0 |
| SiC | <400 | (<0.037) | 0 | 4.3 |
| coal pitch | | | 15 | 15 |
| d (g/cm$^3$) | | | 1.86 | 1.81 |
| $R_E$ (MPa) | | | 45.1 | 23.7 |
| $R_T$ (MPa) | | | 2.1 | 1.3 |
| $\rho$ (milliohm × cm) | | | 11 | 11 |

Comparison in respect of the characteristics of samples N and M shows the beneficial effect of adding silicon in powder form to the initial mixture in the case of this composition based on refractory grains of different qualities, comprising both silicon carbide grains and grains of carbon (anthracite).

EXAMPLE 8

This Example involved producing a series of blocks measuring 160×160 millimeters in section and 800 millimeters in length, intended for blast furnace linings, by extruding a paste of the following composition, in which the refractory grain is composed of SiC and carbonaceous material:

| | % by weight |
|---|---|
| grains of anthracite 11/2–4 mesh (5–13) mm | 30.3 |
| grains of anthracite, 4/10 (1.5–5 mm) | 17.6 |
| silicon carbide 100 mesh (<0.15 mm) | 11.3 |
| carbonaceous powder | 12.2 |
| natural graphite | 8.4 |
| metal silicon | 4.2 |
| pitch | 16.0 |

After firing for 48 hours at 1080° C., the characteristics obtained are as follows:

d=1.70 g/cm$^3$
porosity with a radius>1 μm: 2.5% by volume
$R_E$=39.2 MPa
$R_T$=5.9 MPa
$\rho$=4.2 mΩ cm
$\lambda$=13.5 W.m$^{-1}$L$^{-1}$
Resistance to oxidation, 1 hour at 550° C.=0.8% (drop in weight).

Those blocks were then subjected to tests in respect of resistance to the liquid pig iron, under the following conditions:

(a) resistance to penetration of the liquid pig iron under pressure: a crucible of the material to be tested is formed, and filled with 100 g of liquid pig iron at a temperature of 1500° C., and an increasing inert gas pressure is applied until the first drops of melt begin to seep through the crucible. The result is expressed in terms of the pressure at which the seepage begins to occur. On the standard materials, that pressure $R_p$ is 0.02 MPa;

(b) erosion by the pig iron at 1500° C.: a bar of material to be tested and a reference bar of standard material are immersed in the melt at 1500° C., with agitation, for a period of 4 hours. The result is expressed in terms of the volume eroded in relation to the initial volume. On the standard materials, the erosion E is 22%.

Taking the material of Example 8, the results are as follows:
$R_P$—<0.6 MPa
E—15.5%

EXAMPLE 9

A series of blocks measuring 160×160 mm in section and 800 mm in length was produced, by extruding a paste of the following composition, wherein the refractory grain is composed of SiC and carbonaceous products:

|  | % by weight |
| --- | --- |
| grains of anthracite 11/2–4 mesh (5–13 mm) | 24.6 |
| grains 4/10 mesh (1.5–5 mm) | 14.4 |
| SiC (0.15) | 14.0 |
| carbonaceous powder | 21.6 |
| natural graphite | 4.2 |
| metal silicon | 5.9 |
| pitch | 15.3 |

After firing for 48 hours at 1080° C., the characteristics obtained are as follows:
d=1.75 g/cm$^3$
porosity>1 μm=2.7%
ρ4.8 mΩ .cm
$R_E$=40 MPa
$R_T$=5.9 MPa
resistance to oxidation=0.7% (as defined in Example 4)
λ=11 Wm$^{-1}$K$^{-1}$
liquid pig iron test
$R_P$>0.6 MPa
E: 17.5%

EXAMPLE 10

A series of blocks measuring 165×165 mm in section and 800 mm in length was produced by extruding a paste of the following composition, wherein all the refractory grain is formed by carbonaceous products:

|  | % by weight |
| --- | --- |
| grains of anthracite 11/2–4 mesh (5–13 mm) | 29.3 |
| grains of anthracite 4–10 mesh (1.5–5 mm) | 16.7 |
| carbonaceous powder | 25.8 |
| natural graphite | 8.4 |
| metal silicon | 4.2 |
| pitch | 15.6 |

After firing for 48 hours at 1080° C., the mechanical characteristics obtained are as follows:
d: 1.63
porosity>1 μm: 3.5%
ρ: 3.9 .Ω .cm
$R_E$: 44 MPa
$R_T$: 6.3 MPa
resistance to oxidation: 1.5%
λ: 10.0 Wm$^{-1}$K$^{-1}$ resistance to penetration of the liquid pig iron: >0.6 MPa
erosion by the liquid melt: 14%.

EXAMPLE 11

A series of mixed edging slabs measuring 668×275×120 mm, intended for electrolysis tanks, was prepared by separate mixing of two mixtures M' and O (see Table No 5) and ramming two equal masses of M' and O (O being added on to M'), and then firing for 5 hours at 1050° C. under a cover of carbon granules. Electrical resistivity and mechanical characteristics were measured on testpieces taken in a direction parallel to the ramming action (thickness), and they therefore take account of the junction between M' and O.

TABLE V

Initial mixtures and characteristics of the mixed sample

| Identification | | | M' cold face | O hot face |
| --- | --- | --- | --- | --- |
| Initial mixture | | | % by weight | |
|  | mesh | (mm) |  |  |
| SiC | 14/24 | (0.59 to 1.16) | 40.4 | 41.8 |
| anthracite | — | (<0.2) | 40.3 | 0 |
| Si | <300 | (<0.05) | 4.3 | 4.4 |
| SiC | <300 | (<0.15) | 0 | 41.8 |
| coal pitch |  |  | 15 | 12 |
|  | | | Characteristics of M'O | |
| d (g/cm$^3$) |  |  | 1.97 | |
| $R_E$ (MPa) |  |  | 45.1 | |
| $R_T$ (MPa) |  |  | 4.5 | |
| ρ (milliohm cm) |  |  | 68 | |

The mixed sample M'O tested here is thus made up, in respect on half thereof, of a product M', of the same composition as M, the initial mixture of which contains both silicon carbide and anthracite with an addition of silicon powder, while the other half is made up of a product 0 of which the initial mixture is based on silicon carbide, also with an addition of silicon powder. The mechanical strength of the join made is excellent.

Likewise, satisfactory joins are obtained in the case of mixed blocks which associate a refractory product according to the invention, in which the binder contains in particular carbonaceous residues and silicon in powder form in the metal state, and a refractory product obtained from an initial mixture which is different in composition, which second refractory product may be for example a product obtained from a mixture of carbon and carbonaceous products.

EXAMPLE 12

A series of mixed bricks measuring 668×275×120 mm was prepared by separately mixing two mixtures P and Q (see Table VI) and ramming two equal masses of P and Q, followed by firing for 5 hours at 1050° C. under a cover of carbon granules.

Electrical resistivity and mechanical characteristics were measured on testpieces taken in a direction parallel to the ramming action (thickness), and they therefore take account of the junction between P and Q, the material P being on the side referred to as the cold face and the material Q being on the side referred to as the hot face.

TABLE VI

| Identification | P | Q |
| --- | --- | --- |
| Initial mixture | % by weight | |

TABLE VI-continued

| Identification | mesh | (mm) | P | Q |
|---|---|---|---|---|
| anthracite | 11/2–4 | (5–13) | 31.0 | — |
|  | 4–10 | (1.5–5) | 18.0 | — |
| natural graphite |  |  | 8.6 | 4.4 |
| carbonaceous powder |  |  | 12.5 | — |
| SiC | 14–24 | (0.59–1.16) | — | 46.2 |
| SiC | <100 | (<0.15) | 11.6 | 33.0 |
| Si | <300 | (<0.05) | 4.3 | 4.4 |
| Coal pitch |  |  | 14.0 | 12.0 |

Samples were taken in the lengthwise direction, to take account of the junction between P and Q. As in the previous Example, the junction has excellent mechanical strength.

The following characteristics were measured:
d=1.95
$R_E$=40 MPa
$R_T$=4 MPa

We claim:

1. A fired refractory product based on refractory grains and binder consisting essentially of:
a charge of refractory grains selected from the group consisting of carbonaceous products refractory hard metal compounds, refractory oxides and mixtures thereof, and
securing together said grains, a cement based on coked carbonaceous product and metal silicon in powder form, the proportion of metal silicon being from 1 to 15.8% by weight.

2. A refractory product according to claim 1 wherein the charge of refractory grains consist essentially of grains of carbonaceous product.

3. A refractory product according to claim 1 wherein the charge of refractory grains comprises from 10 to 20% by weight of grains of refractory hard metal compound and from 90 to 80% by weight of grains of carbonaceous product.

4. A refractory product according to claim 1 wherein the charge of refractory grains comprises from 45 to 100% by weight of grains of refractory hard metal compounds and from 55 to 0% by weight of carbonaceous grains.

5. A mixed refractory block having at least two portions characterised in that a portion, is formed by a first refractory product, the other portion, for example the other face, being formed by a second refractory product, at least one of said two refractory products being of a composition according to claim 1.

6. A mixed refractory block according to claim 5 further comprising at least one intermediate layer of a third refractory product, one of the physical properties of which, is of a value intermediate between the same physical property of the first and second refractory products.

7. A process for the production of a refractory product according to claim 1, based on refractory grains and binder, comprising the steps of preparing an initial mixture consisting essentially of:
charge of refractory grains—70 to 95% by weight
pitch, tar, thermosetting resin or cokable organic binder—4 to 20% by weight
metal silicon in powder form—1 to 15% by weight
the refractory grains selected from the group consisting of carbonaceous products, refractory hard metal compounds, refractory oxides and mixtures thereof, shaping said mixture by applying a pressure and firing said shaped mixture at from 950° to 1150° C.

8. A production process according to claim 7 wherein the initial mixture comprises:
charge of refractory grains—75 to 90% by weight
pitch, tar, thermosetting resin or cokable organic binder—6 to 14% by weight
metal silicon in powder form—3 to 10% by weight.

9. A refractory product according to claim 1, wherein said carbonaceous products are selected from the group consisting of anthracite, natural graphite, artificial graphite, amorphous carbon, coke and mixtures thereof.

10. A refractory product according to claim 1, wherein said refractory oxides are selected from the group consisting of alumina, corundum, magnesia, silica, chromium oxide and mixtures thereof.

11. A refractory product according to claim 1, wherein the proportion of metal silicon is from 3 to 10.5% by weight.

12. A refractory product according to claim 1, wherein the charge of refractory grains comprises from 10 to 20% by weight of said grains of refractory hard metal compounds and said grains of refractory oxide, and from 90 to 80% by weight of said grains of carbonaceous product.

13. A refractory product according to claim 1, wherein the charge of refractory grains comprises from 10 to 20% by weight of said grains of refractory hard metal compounds and from 90 to 80% by weight of said grains of carbonaceous product, and said grains of refractory oxide.

14. A mixed refractory block according to claim 5, wherein said portion comprises a face of said block and said other portion comprises another face of said block.

15. A mixed refractory block according to claim 6, wherein said one of the physical properties is the coefficient of expansion.

16. A process according to claim 7, wherein said carbonaceous products are selected from the group consisting of anthracite, natural graphite, artificial graphite, amorphous carbon, coke and mixtures thereof.

17. A process according to claim 7, wherein said refractory oxides are selected from the group consisting of alumina, corundum, magnesia, silica, chromium oxide and mixtures thereof.

18. A process according to claim 7, wherein said step of firing is performed at a temperature of 1000° to 1090° C.

19. A side lining for a tank for the production of aluminum by igneous electrolysis comprising a refractory product according to claim 1.

20. A lining for a blast furnace or an electric furnace for electrometallurgy operations, comprising a refractory product according to claim 1.

* * * * *